(12) United States Patent
Ishida et al.

(10) Patent No.: US 8,561,915 B2
(45) Date of Patent: Oct. 22, 2013

(54) VEHICLE AND METHOD FOR CONTROLLING SAME

(75) Inventors: Minoru Ishida, Mishima (JP); Kunihiko Jinno, Toyota (JP); Keita Honda, Okazaki (JP)

(73) Assignees: Toyota Jidosha Kabushiki Kaisha, Toyota-Shi (JP); Denso Corporation, Kariya (JP)

( * ) Notice: Subject to any disclaimer, the term of this patent is extended or adjusted under 35 U.S.C. 154(b) by 1373 days.

(21) Appl. No.: 11/793,432

(22) PCT Filed: Dec. 21, 2005

(86) PCT No.: PCT/IB2005/004038
§ 371 (c)(1),
(2), (4) Date: Jun. 21, 2007

(87) PCT Pub. No.: WO2006/070287
PCT Pub. Date: Jul. 6, 2006

(65) Prior Publication Data
US 2008/0006711 A1    Jan. 10, 2008

(30) Foreign Application Priority Data
Dec. 27, 2004    (JP) .................................. 2004-377362

(51) Int. Cl.
*B60H 1/00* (2006.01)
*B60H 1/12* (2006.01)
*B60W 10/30* (2006.01)

(52) U.S. Cl.
USPC ......... 237/12.3 R; 237/12.4; 60/698; 60/706; 60/719; 62/133; 180/65.27; 180/65.28; 180/165; 903/930

(58) Field of Classification Search
USPC .............. 237/12.3 R, 12.4; 60/698, 706, 719; 62/133, 161; 180/65.27, 65.28, 165; 903/930
See application file for complete search history.

(56) References Cited

U.S. PATENT DOCUMENTS

| | | | | |
|---|---|---|---|---|
| 4,344,565 A * | 8/1982 | Kojima et al. | ............... | 236/46 R |
| 4,381,480 A * | 4/1983 | Hara et al. | ......................... | 237/5 |
| 4,425,766 A * | 1/1984 | Claypole | ......................... | 62/133 |
| 4,448,035 A * | 5/1984 | Moriyama et al. | ............... | 454/75 |
| 4,510,764 A * | 4/1985 | Suzuki | ............................. | 62/133 |
| 4,698,977 A * | 10/1987 | Takahashi | ........................ | 62/133 |
| 4,748,819 A * | 6/1988 | Takahashi | ........................ | 62/161 |
| 4,858,676 A * | 8/1989 | Bolfik et al. | ................... | 165/202 |
| 4,914,924 A * | 4/1990 | Takahashi | ..................... | 706/900 |
| 4,941,525 A * | 7/1990 | Ito et al. | ........................ | 165/202 |

(Continued)

FOREIGN PATENT DOCUMENTS

| | | |
|---|---|---|
| DE | 198 01 167 C1 | 4/1999 |
| EP | 0 747 247 A | 12/1996 |

(Continued)

*Primary Examiner* — Steven B McAllister
*Assistant Examiner* — Phillip E Decker
(74) *Attorney, Agent, or Firm* — Kenyon & Kenyon LLP

(57) ABSTRACT

When an economy switch signal is ON to instruct that fuel economy should be given priority, a blower of an air conditioning device is operated using a blower characteristic map for fuel economy so that a blower level of the air conditioning device is changed with respect to the change in an engine coolant temperature at a low rate. Also, it is determined whether an engine needs to be operated or stopped using an engine operation map for fuel economy so that the engine is likely to be stopped.

10 Claims, 5 Drawing Sheets

(56) References Cited

U.S. PATENT DOCUMENTS

| | | | |
|---|---|---|---|
| 5,317,998 A | | 6/1994 | Hanson et al. |
| 5,511,724 A | * | 4/1996 | Freiberger et al. ............ 165/202 |
| 5,518,065 A | * | 5/1996 | Asou et al. ...................... 165/43 |
| 5,588,481 A | * | 12/1996 | Dziama et al. .................. 165/42 |
| 5,706,667 A | * | 1/1998 | Iritani et al. .................... 62/230 |
| 5,931,380 A | * | 8/1999 | Aoki et al. ............... 237/12.3 B |
| 5,954,120 A | * | 9/1999 | Aoki et al. ............... 237/12.3 B |
| 5,988,517 A | * | 11/1999 | Bauer et al. ................... 165/217 |
| 6,016,966 A | * | 1/2000 | Inoue .............................. 236/37 |
| 6,027,032 A | * | 2/2000 | Aoki et al. ............... 237/12.3 R |
| 6,073,456 A | | 6/2000 | Kawai et al. |
| 6,173,902 B1 | * | 1/2001 | Bauer et al. ................... 236/49.3 |
| 6,212,900 B1 | * | 4/2001 | Iritani et al. .................... 62/428 |
| 6,328,000 B1 | * | 12/2001 | Hawkins et al. ............ 123/41.12 |
| 6,367,270 B2 | * | 4/2002 | Niimi et al. ..................... 62/133 |
| 6,453,222 B1 | * | 9/2002 | Lasson et al. .................... 701/22 |
| 6,516,621 B2 | * | 2/2003 | Homan et al. ................... 62/133 |
| 6,745,582 B1 | * | 6/2004 | Urbank et al. ................... 62/133 |
| 6,755,033 B2 | * | 6/2004 | Iwanami et al. ................. 62/133 |
| 6,817,330 B1 | * | 11/2004 | Ogawa et al. ................. 123/179.4 |
| 6,855,092 B2 | * | 2/2005 | Duty et al. ..................... 477/121 |
| 6,889,762 B2 | * | 5/2005 | Zeigler et al. .................... 62/133 |
| 7,013,646 B1 | * | 3/2006 | Serkh et al. ...................... 60/698 |
| 7,454,922 B2 | * | 11/2008 | Zeigler et al. ................... 165/202 |
| 7,591,303 B2 | * | 9/2009 | Zeigler et al. ................... 165/271 |
| 2001/0005991 A1 | * | 7/2001 | Niimi et al. ..................... 62/133 |
| 2002/0104324 A1 | | 8/2002 | Homan et al. |
| 2003/0079698 A1 | * | 5/2003 | Morgan et al. ................ 123/41.1 |
| 2003/0230093 A1 | * | 12/2003 | Iwanami et al. .................. 62/133 |
| 2004/0144107 A1 | * | 7/2004 | Breton et al. .................... 62/133 |
| 2005/0109499 A1 | * | 5/2005 | Iwanami et al. ................. 62/229 |
| 2005/0161211 A1 | * | 7/2005 | Zeigler et al. ................... 165/240 |
| 2007/0246554 A1 | * | 10/2007 | Watanabe et al. ............... 237/2 A |
| 2007/0299560 A1 | * | 12/2007 | LaHue et al. .................. 700/276 |
| 2008/0006711 A1 | * | 1/2008 | Ishida et al. ............... 237/12.3 R |
| 2011/0114036 A1 | * | 5/2011 | Radtke et al. ...................... 123/2 |

FOREIGN PATENT DOCUMENTS

| | | | |
|---|---|---|---|
| JP | 60-131310 A | | 7/1985 |
| JP | 04193620 A | * | 7/1992 |
| JP | 05-328520 A | | 12/1993 |
| JP | 09-233601 A | | 9/1997 |
| JP | 10-278569 A | | 10/1998 |
| JP | 11-180137 A | | 7/1999 |
| JP | 2000-219023 A | | 8/2000 |
| JP | 2000-264035 A | | 9/2000 |
| JP | 2001-206040 A | | 7/2001 |
| JP | 2001341515 A | * | 12/2001 |
| JP | 2002-211238 A | | 7/2002 |
| JP | 2003034126 A | * | 2/2003 |
| JP | 2007230321 A | * | 9/2007 |
| JP | 2009255917 A | * | 11/2009 |
| WO | WO 2005/115787 A | | 12/2005 |

* cited by examiner

F I G . 7
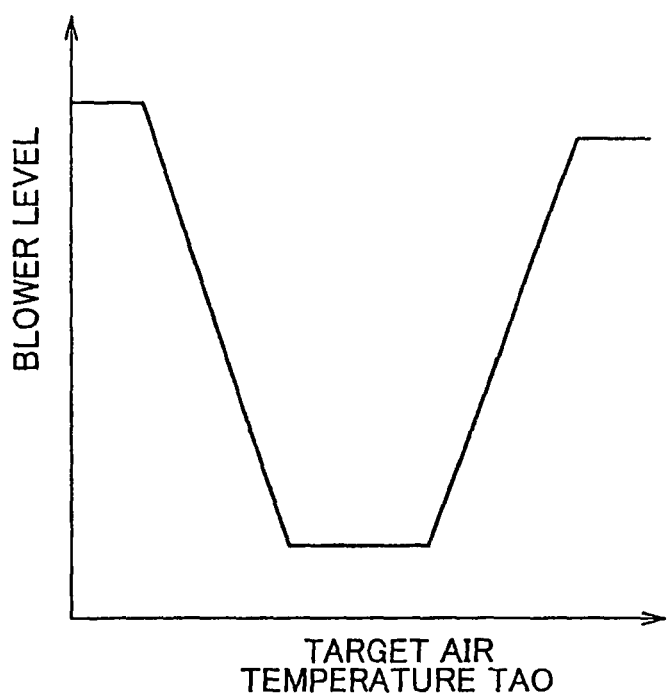

VEHICLE AND METHOD FOR CONTROLLING SAME

This is a 371 national phase application of PCT/IB2005/004038 filed 21 Dec. 2005, claiming priority to Japanese Patent Application No. 2004-377362 filed 27 Dec. 2004, the contents of which are incorporated herein by reference.

BACKGROUND OF THE INVENTION

1. Field of the Invention

The invention relates to a vehicle and a method for controlling the same.

2. Description of the Related Art

Vehicles in which an economy mode is set to give priority to fuel economy are proposed. Japanese Patent Application Publication No. JP-A-11-180137 describes an example of such vehicles. In the vehicle described in the publication, an engine that outputs power for driving the vehicle serves as a heat source for air conditioning, and the frequency with which the engine is started is changed by turning an economy switch on and off. In the vehicle, when the economy switch is turned on, the temperature at which a compressor for air conditioning is started is set to a high temperature, and the compressor is intermittently turned off, which reduces the frequency with which the engine is started for air conditioning. This reduces the rate of fuel consumption.

In the vehicle, the frequency with which the compressor is turned off is increased, which may reduce the performance of air conditioning. Meanwhile, when a vehicle compartment is heated, it is preferable to change the flow amount of air delivered to the vehicle compartment, based on the temperature of the engine that serves as the heat source for air conditioning (i.e., the temperature of coolant), taking into account the temperature felt by the occupant.

SUMMARY OF THE INVENTION

It is an object of the invention to provide a vehicle where a vehicle compartment can be appropriately heated when fuel economy is give priority, and a method for controlling the same.

In order to achieve the above object, an aspect of the invention relates to a vehicle that includes an internal combustion engine, heating means, fuel economy priority instruction means, and control means. The internal combustion engine can output power for driving a vehicle. The heating means can heat a vehicle compartment by delivering, to the vehicle compartment, air heated by the internal combustion engine that serves as a heat source. The fuel economy priority instruction means provides or stops providing an instruction to give priority to fuel economy. The control means sets the flow amount of heated air to be delivered and makes a request to operate or stop the internal combustion engine such that fuel economy is improved in the case where the instruction to give priority to fuel economy is provided, as compared to the case where the instruction is not provided, and controls the heating means and the internal combustion engine based on the set flow amount of heated air and the request to operate or stop the internal combustion engine.

In the aforementioned vehicle, the flow amount of heated air to be delivered is taken into account when the vehicle compartment is heated. Therefore, the vehicle compartment can be appropriately heated when fuel economy is given priority.

In the aforementioned vehicle, the control means may set the flow amount of heated air to be delivered such that the flow amount of heated air is changed with respect to the change in the temperature of coolant in the internal combustion engine at a low rate in the case where the instruction to give priority to fuel economy is provided, as compared to the case where the instruction is not provided. Also, the control means may set the flow amount of heated air to be delivered such that there is a great difference between a first coolant temperature, at a corresponding value of the flow amount, when the flow amount is increased with respect to a temperature of coolant, and a second coolant temperature, at the same corresponding value of the flow amount, when the flow amount is decreased with respect to the temperature of the coolant, as compared to the case where the instruction is not provided. With this configuration, in the case where the instruction to give priority to fuel economy is provided, the flow amount of heated air to be delivered is changed with respect to the change in the temperature of coolant in the internal combustion engine at a low rate. Therefore, it is possible to reduce the possibility that the temperature felt by the occupant is sharply changed due to the change in the flow amount of delivered heated air is changed at a large rate. As a result, the vehicle compartment can be appropriately heated.

The aforementioned vehicle may further include temperature detection means for detecting the temperature of the vehicle compartment, and the control means may set the flow amount of heated air to be delivered based on the temperature of the vehicle compartment, which is detected by the temperature detection. With this configuration, because the flow amount of heated air to be delivered is set based on the temperature of the vehicle compartment, the vehicle compartment can be appropriately heated.

Further, in the aforementioned vehicle, the control means may make the request to operate or stop the internal combustion engine such that the internal combustion engine is likely to be stopped in the case where the instruction to give priority to fuel economy is provided, as compared to the case where the instruction is not provided. With this configuration, the frequency with which the internal combustion engine is started can be reduced in the case where the instruction to give priority to fuel economy is provided. This improves fuel economy.

In the aforementioned vehicle, the control means may make the request to operate or stop the internal combustion engine such that the internal combustion engine is stopped when the temperature of air delivered to the vehicle compartment is low in the case where the instruction to give priority to fuel economy is provided, as compared to the case where the instruction is not provided.

Also, in the aforementioned vehicle, the control means may make the request to operate or stop the internal combustion engine based on the operation for driving the vehicle.

The aforementioned vehicle may filter include a motor that can output electric power for driving the vehicle, and storage means that can receive the electric power from the motor, and can transmit the electric power to the motor.

Another aspect of the invention relates to a vehicle that includes an internal combustion engine, a heating device, a fuel economy priority instruction portion, and a control portion. The internal combustion engine can output power for driving a vehicle. The heating device can heat a vehicle compartment by delivering, to the vehicle compartment, air heated by the internal combustion engine that serves as a heat source. The fuel economy priority instruction portion provides or stops providing an instruction to give priority to fuel economy. The control portion sets the flow amount of heated air to be delivered and makes a request to operate or stop the internal combustion engine such that fuel economy is improved in the case where the instruction to give priority to fuel economy is provided, as compared to the case where the instruction is not provided, and controls the heating device and the internal combustion engine based on the set flow amount of heated air and the request to operate or stop the internal combustion engine.

Another aspect of the invention relates to a method for controlling a vehicle that includes a vehicle that includes an internal combustion engine, heating means, and fuel economy priority instruction means. The internal combustion engine can output power for driving a vehicle. The heating means can heat a vehicle compartment by delivering, to the vehicle compartment, air heated by the internal combustion engine that serves as a heat source. The fuel economy priority instruction means provides or stops providing an instruction to give priority to fuel economy. The method includes setting the flow amount of heated air to be delivered and making a request to operate or stop the internal combustion engine such that fuel economy is improved in the case where the instruction to give priority to fuel economy is provided, as compared to the case where the instruction is not provided; and controlling the heating means and the internal combustion engine based on the set flow amount of heated air and the request to operate or stop the internal combustion engine.

In the method for controlling the vehicle, the flow amount of heated air to be delivered is taken into account when the vehicle compartment is heated. Therefore, the vehicle compartment can be appropriately heated when fuel economy is given priority.

Another aspect of the invention relates to a method for controlling a vehicle includes setting the flow amount of heated air to be delivered and making a request to operate or stop the internal combustion engine such that fuel economy is improved in the case where the instruction to give priority to fuel economy is provided, as compared to the case where the instruction is not provided; and controlling the heating means and the internal combustion engine based on the set flow amount of heated air and the request to operate or stop the internal combustion engine.

BRIEF DESCRIPTION OF THE DRAWINGS

The foregoing and/or further objects, features and advantages of the invention will become more apparent from the following description of example embodiment with reference to the accompanying drawings, in which the same or corresponding portions are denoted by the same reference numerals and wherein:

FIG. 7 illustrates an example of a blower level setting map.

DETAILED DESCRIPTION OF THE EXAMPLE EMBODIMENTS

Figure 1:
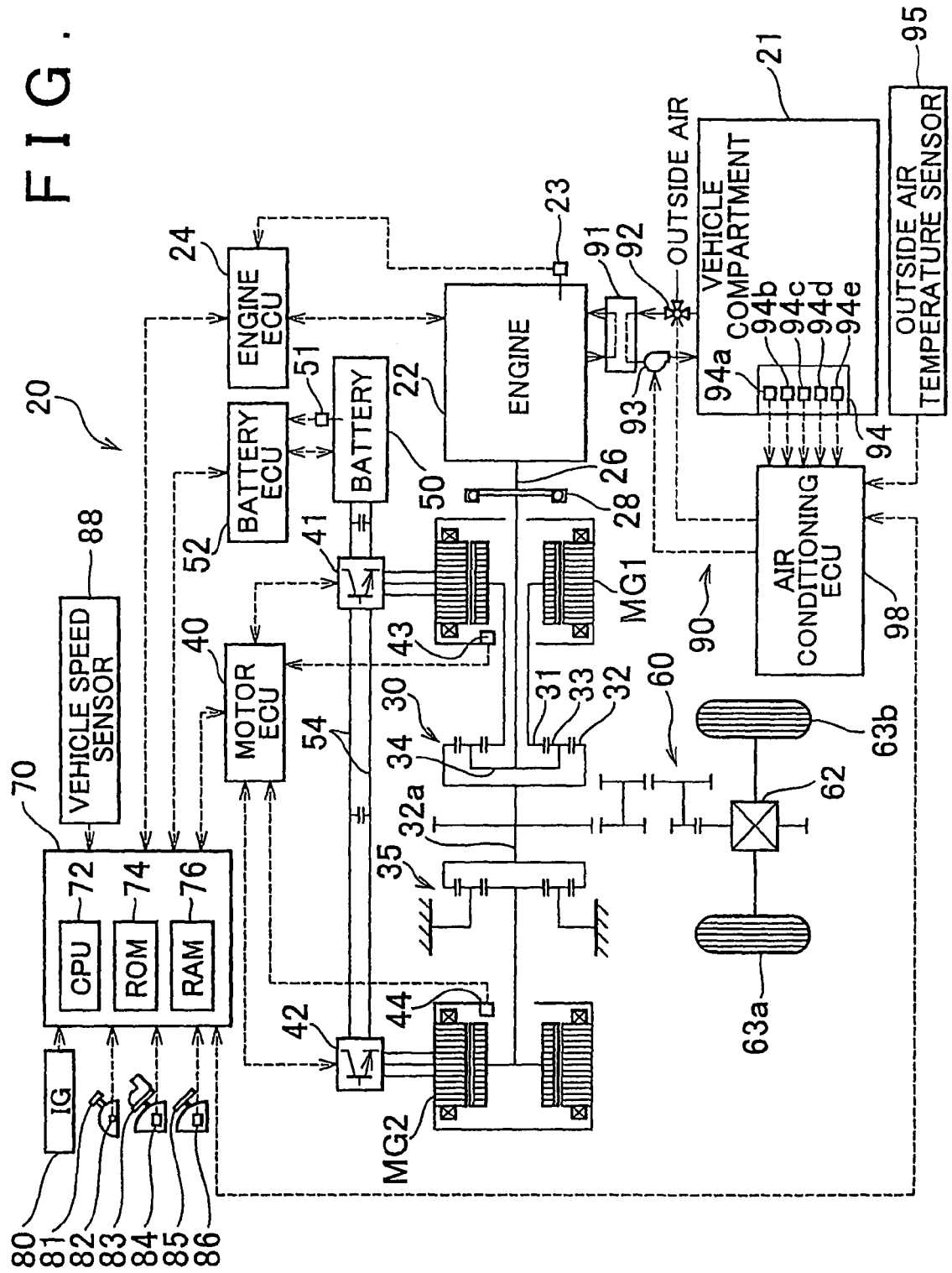
FIG. 1 schematically illustrates the configuration of a hybrid vehicle 20 according to an example embodiment of the invention.

FIG. 1 schematically illustrates the configuration of a hybrid vehicle 20 according to an example embodiment of the invention. As shown in FIG. 1, the hybrid vehicle 20 according to the embodiment includes an engine 22; a three-axial power transfer mechanism 30; a motor MG1 that can generate electric power, a reduction gear 35; an air conditioning device 90; and an electronic control unit for hybrid (hereinafter, referred to as "hybrid ECU") 70. The three-axial power transfer mechanism 30 is connected to a dumper 28 via a crankshaft 26 that is the output shaft of the engine 22. The motor MG1 is connected to the power transfer mechanism 30. The reduction gear 35 is fitted to a ring gear shaft 32a. The ring gear shaft 32a, which serves as a drive shaft, is connected to the power transfer mechanism 30. A motor MG2 is connected to the reduction gear 35. The air conditioning device 90 cools and heats a vehicle compartment 21. The hybrid ECU 70 controls the entire vehicle.

The engine 22 is an internal combustion engine that outputs power using hydrocarbon fuel such as gasoline or diesel oil. An electronic control unit for an engine (hereinafter, referred to as "engine ECU") 24 executes various controls for the engine 22. That is, the engine ECU 24 controls fuel injection, ignition, the amount of intake air, and the like. The engine ECU 24 receives signals from various sensors that detect the operating state of the engine 22, such as a coolant temperature sensor 23 that detects an engine coolant temperature Tw. The engine ECU 24 communicates with the hybrid ECU 70. The engine ECU 24 controls the engine 22 according to the control signals transmitted from the hybrid ECU 70. Also, the engine ECU 24 outputs data concerning the operating state of the engine 22 to the hybrid ECU 70 when necessary.

The power transfer mechanism 30 includes an external-tooth sun gear 31; an internal-tooth ring gear 32; a plurality of pinions 33; and a carrier 34. The internal-tooth ring gear 32 is disposed concentrically with the sun gear 31. The plurality of pinions 33 are engaged with the sun gear 31. Also, the plurality of pinions 33 are engaged with the ring gear 32. The carrier 34 supports the pinions 33 such that each of the pinions can rotate around the axis thereof, and can move around the sun gear 31. The power transfer mechanism 30 is configured as a planetary gear mechanism that produces a differential effect using the sun gear 31, the ring gear 32, and the carrier 34 as rotating elements. The crankshaft 26 of the engine 22 is connected to the carrier 34. The motor MG1 is connected to the sun gear 31. The reduction gear 35 is connected to the ring gear 32 via the ring gear shaft 32a. When the motor MG1 functions as a generator, power transmitted from the engine 22 to the carrier 34 is distributed to the sun gear 31 and the ring gear 32 according to the gear ratio thereof. When the motor MG1 functions as a motor, power transmitted from the engine 22 to the carrier 34 is combined with power transmitted from the motor MG1 to the sun gear 31, and the combined power is output to the ring gear 32. The power transmitted to the ring gear 32 is output to drive wheels 63a and 63b via a-ring gear shaft 32a, a gear mechanism 60, and a differential gear 62.

Each of the motors MG1 and MG2 is configured as a known synchronous motor-generator that can function as a generator and a motor. Power is transmitted between the motors MG1 and MG2 and a battery 50 via inverters 41 and 42 connected to a power line 54. Each of the motors MG1 and MG2 is controlled by an electronic control unit for the motors (hereinafter, referred to as "motor ECU") 40. The motor ECU 40 receives signals required to control the motors MG1 and MG2. For example, the motor ECU 40 receives signals indicative of the rotational positions of the rotors of the motors MG1 and MG2; and signals indicative of phase current applied to the motors MG1 and MG2. The rotational positions of the rotors of the motors MG1 and MG2 are detected by the rotational position detection sensors 43 and 44. The phase current is detected by a current sensor (not shown). The motor ECU 40 outputs switching control signals to the inverters 41 and 42. The motor ECU 40 communicates with the hybrid ECU 70. The motor ECU 40 controls the motors MG1 and MG2 according to the control signal transmitted from the hybrid ECU 70. Also, the motor ECU 40 outputs, to the hybrid ECU 70, data concerning the operating states of the motors MG1 and MG2 when necessary.

An electronic control unit for the battery (hereinafter, referred to as "battery ECU") 52 controls the battery 50. The battery ECU 52 receives signals required to control the battery 50. For example, the battery ECU 52 receives a signal indicative of voltage between terminals, a signal indicative of charge/discharge current, and a signal indicative of a battery temperature Tb. The voltage between terminals is detected by a voltage sensor (not shown) provided between the terminals of the battery 50. The charge/discharge current is detected by a current sensor (not shown) fitted to the power line 54 connected to the output terminal of the battery 50. The battery temperature Tb is detected by a temperature sensor 51 fitted to the battery 50. The battery ECU 52 transmits, to the hybrid ECU 70, data concerning the state of the battery 50 when necessary. To control the battery 50, the battery ECU 52 calculates the state of charge (SOC) of the battery 50, based on the accumulated value obtained by accumulating the values of charge/discharge current that are detected by the current sensor. Further, the battery ECU 52 calculates an input limit Win and an output limit Wout of the battery 50 based on the state of charge (SOC) of the battery 50 and the battery temperature Tb.

The air conditioning device 90 includes a heat exchanger 91; a blower 93; a switching mechanism 92; an operation panel 94; and an electronic control unit for air conditioning (hereinafter, referred to as "air conditioning ECU") 98. The heat exchanger 91 is provided in a cooling system for the engine 22. Heat is exchanged between the heat exchanger 91 and coolant. The blower 93 sucks outside air and air in the vehicle compartment 21 so as to introduce the air to the heat exchanger 91. Also, the blower 93 discharges the air heated due to heat exchange performed by the heat exchanger 91. The blower 93 corresponds to the heating means or the heating device according to the invention. The switching mechanism 92 allows the blower 93 to suck the outside air or the air in the vehicle compartment 21. The operation panel 94 is fitted to the vehicle compartment 21. The air conditioning ECU 98 controls the entire air conditioning device 90. The air conditioning ECU 98 corresponds to the control means or the control portion according to the invention. The air conditioning ECU 98 receives a blower switch signal BSW, a signal indicative of a set temperature T*, a signal indicative of a vehicle compartment temperature Tin, a signal indicative of a solar radiation amount Q, an economy switch signal ESW, a signal indicative of an outside air temperature Tout, and the like. The blower switch signal BSW is transmitted from a blower switch 94a. The blower switch 94a is provided on the operation panel 94, and turns a heater on and off. The signal indicative of the set temperature T* is transmitted from a set temperature switch 94b. The set temperature switch 94b is provided on the operation panel 94, and sets the temperature in the vehicle compartment 21. The signal indicative of the solar radiation amount Q is transmitted from a solar radiation sensor 94d. The solar radiation sensor 94d is provided on the operation panel 94, and detects the amount of solar radiation in the vehicle compartment 21. The economy switch signal ESW is transmitted from an economy switch 94e. The economy switch 94e is provided on the operation panel 94.

The economy switch signal ESW instructs that fuel economy of the vehicle should be given priority over the function of the heater. The economy switch 94e corresponds to the fuel economy priority instruction means or the fuel economy priority instruction portion according to the invention. The signal indicative of the outside air Tout is transmitted from an outside air temperature sensor 95. The outside air temperature sensor 95 is provided outside of the vehicle compartment 21, and detects the temperature of the outside air. The air conditioning ECU 98 controls the blower 93 based on these signals so that the vehicle compartment temperature Tin becomes equal to the set temperature T*. Also, the air conditioning ECU 98 communicates with the hybrid ECU 70. The air conditioning ECU 98 outputs, to the hybrid ECU 70, data concerning the state of the air conditioning device 90 when necessary.

The hybrid ECU 70 is configured as a microprocessor that includes a CPU 72, ROM 74, RAM 76, input/output ports (not shown), and a communication port (not shown). Programs are stored in the ROM 74. Data is temporarily stored in the RAM 76. The hybrid ECU 70 receives an ignition signal, a signal indicative of a shift position SP, a signal indicative of an accelerator pedal operation amount Acc, a signal indicative of a brake pedal position BP, a signal indicative of a vehicle speed V, and the like via the input port. The ignition signal is transmitted from an ignition switch 80. The signal indicative of the shift position SP is transmitted from a shift position sensor 82 that detects the position of a shift lever 81. The signal indicative of the accelerator pedal operation amount Acc is transmitted from an accelerator pedal position sensor 84 that detects the operation amount of the accelerator pedal 83. The signal indicative of the brake pedal position BP is transmitted from a brake pedal position sensor 86 that detects the operation amount of a brake pedal 85. The signal indicative of the vehicle speed V is transmitted from a vehicle speed sensor 88. As described above, the hybrid ECU 70 is connected to the engine ECU 24, the motor ECU 40, and the battery ECU 52 via the communication port. The control signals and data are transmitted between the hybrid ECU 70 and the engine ECU 24, the motor ECU 40, and the battery ECU 52.

In the hybrid vehicle 20 according to the embodiment, torque required to be output to the ring gear shaft 32a that is the drive shaft is calculated based on the accelerator pedal operation amount Acc that is the operation amount of the accelerator pedal 83, and the vehicle speed V. Next, the engine 22 and the motors MG1 and MG2 are controlled so that power corresponding to the required torque is output to the ring gear shaft 32a. For example, the engine 22 is controlled so that power equal to the required power is output from the engine 22; and the motors MG1 and MG2 are controlled so that all of the power output from the engine 22 is transmitted to the ring gear 32a, after torque is changed by the power transfer mechanism 30 and the motors MG1 and MG2. Also, for example, the engine 22 is controlled so that power equal to sum of the required power and electric power required for charging/discharging of the battery 50 is output from the engine 22; and (i) the motors MG1 and MG2 are controlled so that all or part of the power output from the engine 22 is transmitted to the ring gear shaft 32a and charging/discharging of the battery 50 is performed after torque is changed by the power transfer mechanism 30, and the motors MG1 and MG2. Thus, power equal to the required power is transmitted to the ring gear shaft 32a; or (ii) the engine 22 is stopped, and the motors MG1 and MG2 are controlled so that power equal to the required power is output from the motor MG2 and is transmitted to the ring gear shaft 32a. The control described in the section (i) is referred to as "engine running mode". The control described in the section (ii) is referred to as "motor running mode".

The running mode is changed between the engine running mode and the motor running mode based on the results of two determinations described below. First, it is determined whether the engine 22 needs to be operated based on whether the power required in the vehicle, which is the sum of the power required for driving the vehicle and the power required for charging/discharging of the battery 50, is greater than a variable threshold value. Secondly, it is determined whether the engine 22 needs to be operated as a heat source so that the air conditioning device 90 can heat the vehicle compartment 21. In the embodiment, if it is determined that the engine 22 needs to be operated in the first determination or the second determination when the vehicle runs in the motor running mode, the running mode is changed from the motor running mode to the engine running mode. Meanwhile, if it is determined that the engine 22 does not need to be operated in each of the first determination and the second determination when the vehicle runs in the engine running mode, the running mode is changed from the engine running mode to the motor running mode. The control for each of the engine running mode and the motor running mode, and the determinations as to whether the engine 22 needs to be operated based on the required power are not related to the important feature of the invention, and therefore, detailed description thereof win be omitted.

Next, the operation of the hybrid vehicle 20 according to the embodiment will be described. The operation of the hybrid vehicle 20 when the air conditioning device 90 heats the vehicle compartment 21 will be described in detail. Also, the determination as to whether the engine 22 needs to be operated based on the on/off state of the economy switch 94e will be described in detail.

Figure 2:
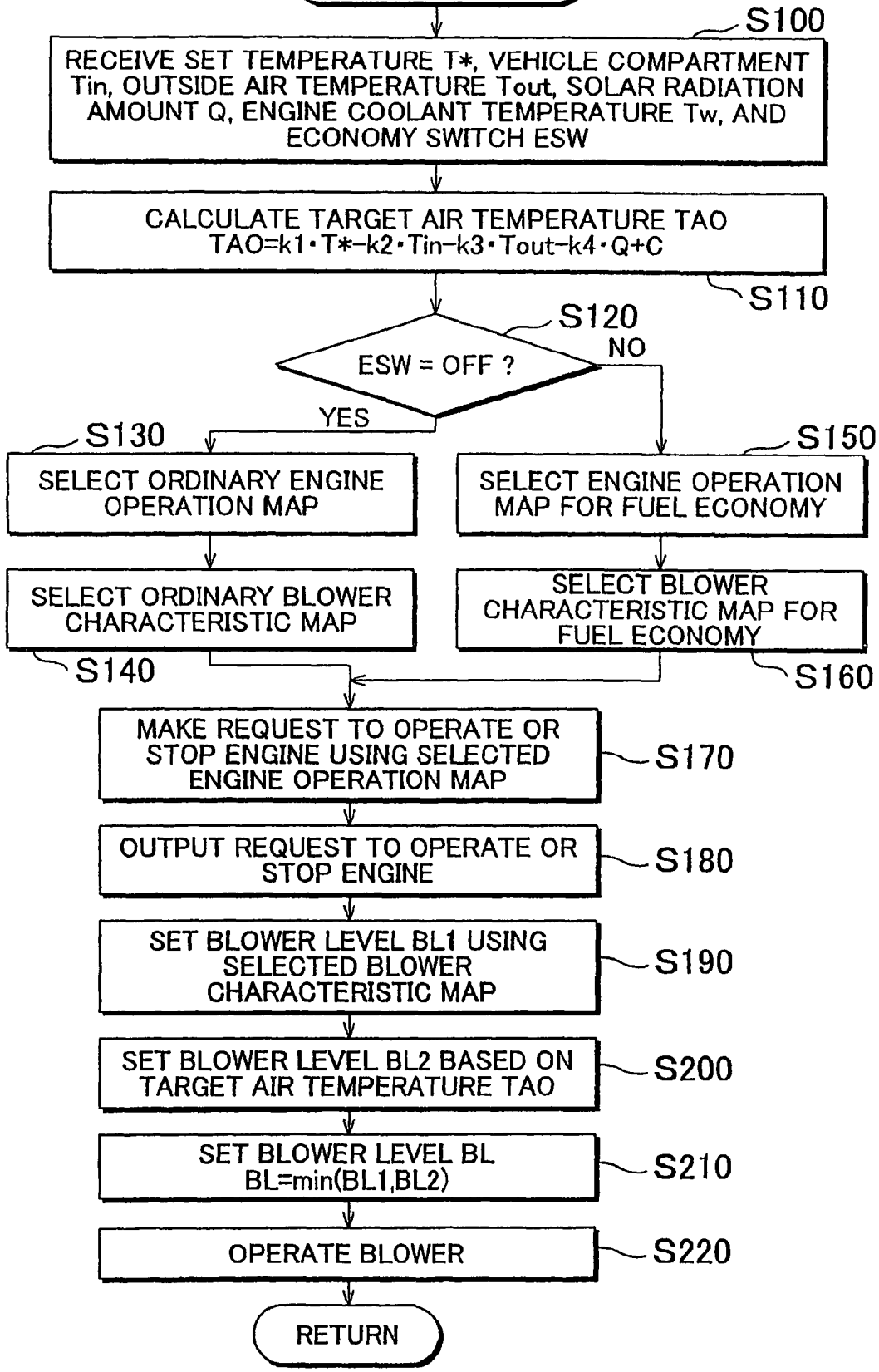
FIG. 2 illustrates the flowchart of an example of a blower drive control routine executed by an air conditioning ECU 98 according to the embodiment.

FIG. 2 illustrates the flowchart showing an example of a blower drive control routine that is executed by the air conditioning ECU 98. This routine is repeatedly executed at predetermined time intervals (for example, at time intervals of several tens milliseconds) when the blower switch signal BSW is ON.

When the blower drive control routine is executed, first, the air conditioning ECU 98 receives data required to control the air conditioning device 90. That is, the air conditioning ECU 98 receives the set temperature T* from the set temperature switch 94b, the vehicle compartment temperature Tin from the temperature sensor 94c, the solar radiation amount Q from the solar radiation sensor 94d, the economy switch signal ESW from the economy switch 94e, the outside air temperature Tout from the outside air temperature sensor 95, the engine coolant temperature Tw, and the like (step S100). The engine coolant temperature Tw is detected by the coolant temperature sensor 23, and the signal indicative of the engine coolant temperature Tw is transmitted from the coolant temperature sensor 23 to the engine ECU 24. Then, the signal indicative of the engine coolant temperature Tw is transmitted from the engine ECU 24 to the air conditioning ECU 98. After receiving the required data, the air conditioning ECU 98 calculates a target temperature of air delivered to the vehicle compartment 21 (hereinafter, referred to as "target air temperature TAO") based on the set temperature T*, the vehicle compartment temperature Tin, the outside air temperature Tout, the solar radiation amount Q, and the like (step S110). The target air temperature TAO is calculated according to an equation (1) described below. In the equation (1), k1, k2, k3, and k4 represent gains for the set temperature T*, the vehicle compartment temperature Tin, the outside air temperature Tout, and the solar radiation amount Q, respectively, and C is a constant value for correction.

$$TAO = k1 \cdot T^* - k2 \cdot Tin - k3 - Tout - K4 \cdot Q + C \quad (1)$$

Next, it is determined whether the economy switch signal ESW is OFF (step S120).

If the economy switch signal ESW is OFF, an ordinary engine operation map is selected for determining whether the engine 22 needs to be operated (step S130). Further, an ordinary blower characteristic map is selected for deciding the level of the blower 93 (hereinafter, referred to as "blower level") (step S140). The blower level corresponds to the flow amount of heated air according to the invention.

If the economy switch signal ESW is ON, an engine operation map for fuel economy is selected (step S150). In the case where the determination is made using the engine operation map for fuel economy, the engine 22 is likely to be stopped as compared to the case where the determination is made using the ordinary engine operation map. Further, a blower characteristic map for fuel economy is selected (step S160). In the case where the blower level is decided using the blower characteristic map for fuel economy, the blower level is likely to be low and the blower level is likely to be changed at a low rate, as compared to the case where the blower level is decided using the ordinary blower characteristic map.

Figure 3:
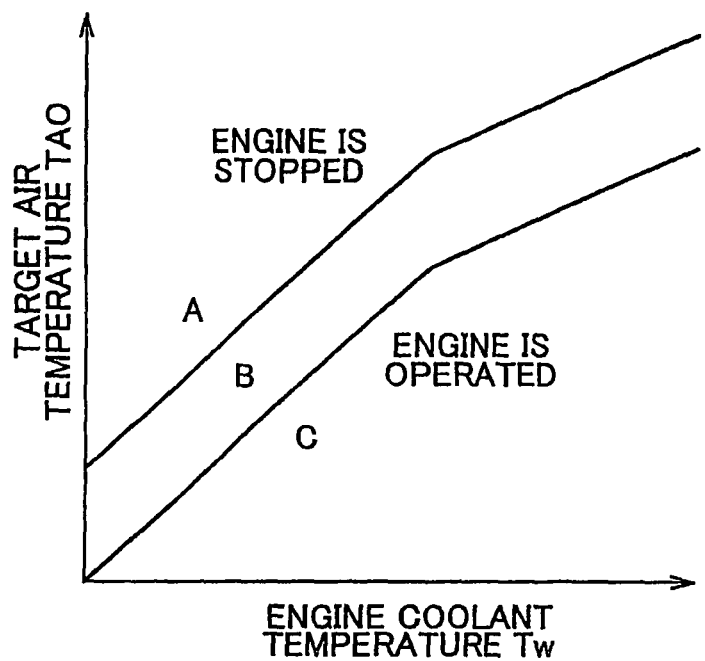
FIG. 3 illustrates an example of an ordinary engine operation map.
Figure 4:
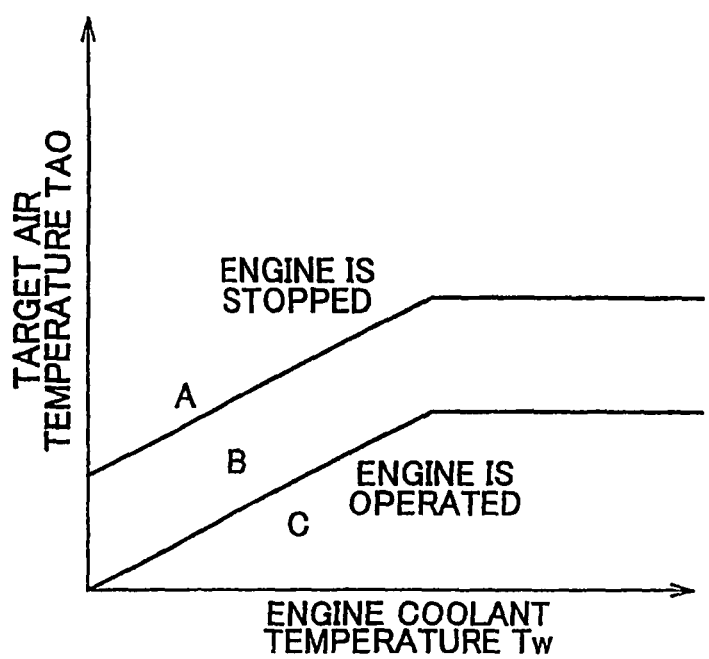
FIG. 4 illustrates an example of an engine operation map for fuel economy.

FIG. 3 illustrates an example of the ordinary engine operation map. FIG. 4 illustrates an example of the engine operation map for fuel economy. In each of the maps, a request to stop the engine 22 is made in a region "A". Also, in each of the maps, a request to operate the engine 22 is made in a region "C". A region "B" is referred to as "hysteresis region". Scales on the vertical axis and the horizontal axis in both the maps are the same. In the engine operation map for fuel economy, a lower limit value of the target air temperature TAO for making the request to stop the engine 22 is lower than that in the ordinary engine operation map. Therefore, in the case where the determination is made using the engine operation map for fuel economy, the engine 22 is likely to be stopped as compared to the case where the determination is made using the ordinary engine operation map.

Figure 5:
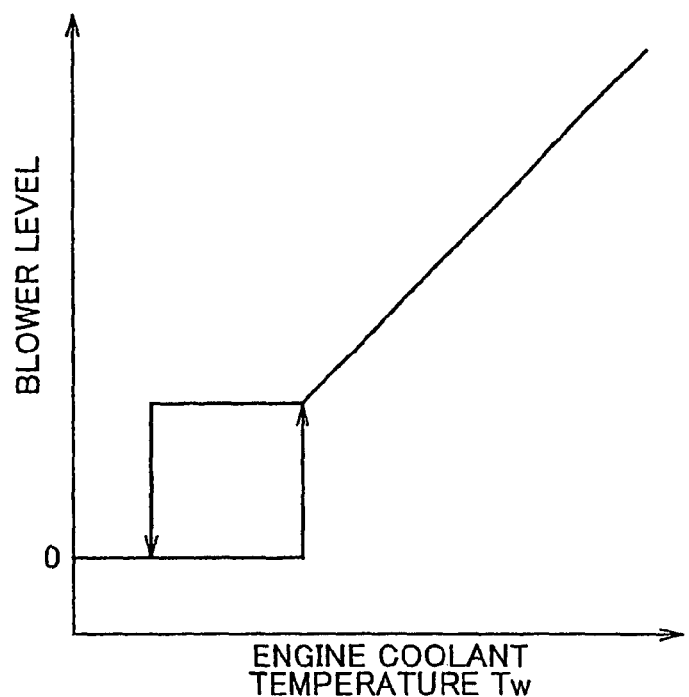
FIG. 5 illustrates an example of an ordinary blower characteristic map.
Figure 6:
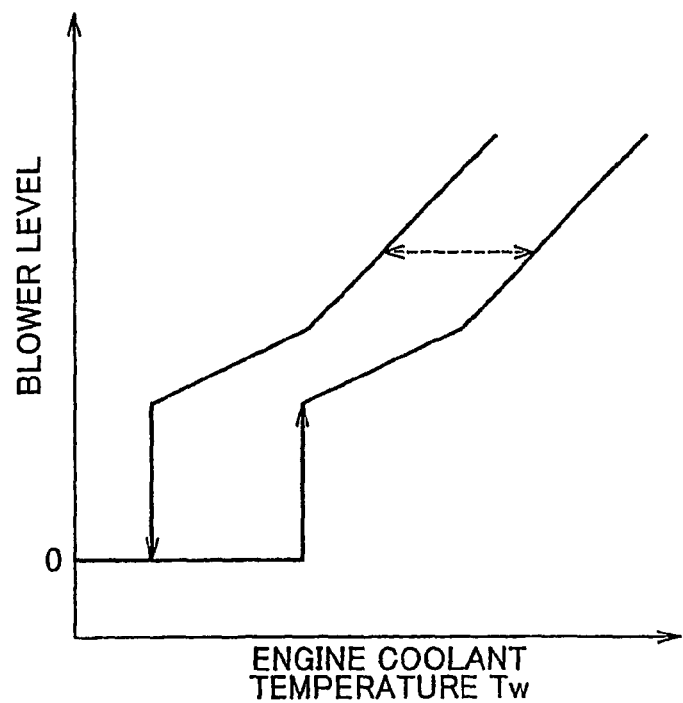
FIG. 6 illustrates an example of a blower characteristic map for fuel economy.

FIG. 5 illustrates an example of the ordinary blower characteristic map. FIG. 6 illustrates an example of the blower characteristic map for fuel economy. Scales on the vertical axis and the horizontal axis in both the maps are the same. In the blower characteristic map for fuel economy, when the engine coolant temperature Tw is low, the blower level is increased at a low rate, as compared to the ordinary blower characteristic map. In addition, in the blower characteristic map for fuel economy, the line showing the increase in the blower level with respect to the increase in the engine coolant temperature Tw is greatly different from the line showing the decrease in the blower level with respect to the decrease in the engine coolant temperature Tw. Thus, in the case where the blower characteristic map for fuel economy is used, the blower 93 is prevented from being frequently stopped due to the change in the engine coolant temperature Tw.

After the engine operation map and the blower characteristic map are selected, the request to operate or stop the engine 22 is made using the selected engine operation map (step S170). Next, the request to operate or stop the engine 22 is output to the hybrid ECU 70 (step S180). The hybrid ECU 70 selects the running mode between the engine running mode and the motor running mode based on the request to stop the engine 22 or the request to operate the engine 22 that is received, and the power required in the vehicle. That is, in the case where the request to operate the engine 22 is received when the vehicle runs in the motor running mode, or in the case where it is determined that the engine 22 needs to be operated based on the power required in the vehicle, the hybrid ECU 70 selects the engine running mode. In the case where the request to stop the engine 22 is received when the vehicle runs in the engine running mode, and it is determined that the engine 22 needs to be stopped based on the power required in the vehicle, the hybrid ECU 70 selects the motor running mode.

Subsequently, a blower level BL1 is set using the received engine coolant temperature Tw and the selected blower characteristic map (step S190). Next, a blower level BL2 is set based on the target air temperature TAO (step S200). In this embodiment, a blower level setting map showing the relation between the target air temperature TAO and the blower level BL2 is made and stored in the air conditioning ECU 98 in advance. When the target air temperature TAO is received, the value of the blower level BL2 corresponding to the target air temperature TAO is obtained from the map. Thus, the blower level BL2 is set to the value obtained from the map. FIG. 7 illustrates an example of the blower level setting map.

After the blower levels BL1 and BL2 are set, one of the blower levels BL1 and BL2 which is smaller than the other is selected as a blower level BL that is used to operate the blower 93 (step S210). The blower 93 is operated so that the blower level becomes equal to the blower level BL (step S220). Then, this routine is terminated. By operating the blower 93 in this manner, the blower 93 is prevented form being operated at the high blower level when the engine coolant temperature Tw is low. Also, the blower 93 is prevented from being operated at the high blower level when the target air temperature TAO is low. As described above, the blower level BL1 is set using the engine coolant temperature Tw and the selected blower characteristic map. Accordingly, when the blower characteristic map for fuel economy is selected, the blower level is changed with respect to the change in the engine coolant temperature Tw at a low rate. As a result, the blower 93 is prevented from being operated and stopped frequently due to the change in the engine coolant Tw. As a result, the blower 93 of the air conditioning device 90 can be operated appropriately. In other words, the vehicle compartment 21 can be heated appropriately when the economy switch signal ESW is ON.

In the hybrid vehicle 20 according to the embodiment, when the economy switch signal ESW is ON, the blower 93 of the air conditioning device 90 is operated using the blower characteristic map for fuel economy. In addition, it is determined whether the engine 22 needs to be operated using the engine operation map for fuel economy. With this configuration, fuel economy is improved when the vehicle compartment 21 is heated. Also, the vehicle compartment 21 is heated appropriately when fuel economy is give priority.

In the blower characteristic map for fuel economy that is used in the hybrid vehicle 20 according to the embodiment of the invention, when the engine coolant Tw is low, the blower level is increased at a low rate, as compared to the ordinary blower characteristic map. In addition, in the blower characteristic map for fuel economy, the line showing the increase in the blower level with respect to the increase in the engine coolant temperature Tw is greatly different from the line showing the decrease in the blower level with respect to the decrease in the engine coolant temperature Tw, as compared to the ordinary blower characteristic map. However, the blower characteristic map for fuel economy may be configured such that, when the engine coolant Tw is low, the blower level is increased at a low rate as compared to the ordinary blower characteristic map, but the line showing the increase in the blower level with respect to the increase in the engine coolant temperature Tw matches the line showing the decrease in the blower level with respect to the decrease in the engine coolant temperature Tw. Also, the blower characteristic map for fuel economy may be configured to be the same as the ordinary blower characteristic map except that the line showing the increase in the blower level with respect to the increase in the engine coolant temperature Tw is greatly different from the line showing the decrease in the blower level with respect to the decrease in the engine coolant temperature Tw.

In the embodiment, the invention is applied to the hybrid vehicle 20 including the power system that includes the engine 22, the power transfer mechanism 30, and the two motors MG1 and MG2. However, the invention may be applied to any vehicle where an engine is used as a heat source for heating a vehicle compartment, and the engine can be operated intermittently. For example, the invention can be applied to a vehicle where an engine is automatically stopped if a condition for automatically stopping the engine is satisfied when the vehicle is stopped, and the engine that has been automatically stopped is automatically started when a condition for automatically starting the engine is satisfied.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A method of controlling a vehicle, comprising:
setting a flow amount of heated air to be delivered by a heating device and switching between operating and stopping an internal combustion engine of the vehicle and
controlling the heating device and the internal combustion engine based on the set flow amount of heated air and the switching between operating and stopping the internal combustion engine, and
setting the flow amount of heated air to be delivered such that the flow amount of heated air is changed, with respect to a change in a temperature of coolant in the internal combustion engine, at a lower rate when a signal to give priority to fuel economy is provided, as compared to when the signal is not provided.

2. A method of controlling a vehicle that includes an internal combustion engine that can output power for driving a vehicle; the heating device which can heat a vehicle compartment by delivering, to the vehicle compartment, air heated by the internal combustion engine that serves as a heat source; and a fuel economy priority instruction device that provides or stops providing the signal to give priority to fuel, the method comprising the setting and controlling steps of claim 1.

3. The method according to claim 1, further comprising controlling the heating device in order for the flow amount of heated air to be delivered by the heating device, such that the flow amount of heated air is changed, with respect to the change in a temperature of coolant in the internal combustion engine, at a lower rate when the signal to give priority to fuel economy is provided, as compared to when the signal is not provided.

4. A vehicle, comprising:
an internal combustion engine that can output power for driving a vehicle;

a heating device that can heat a vehicle compartment by delivering, to the vehicle compartment, air heated by the internal combustion engine that serves as a heat source;

a fuel economy priority instruction portion that provides or stops providing a signal to give priority to fuel economy; and a control portion that controls the heating device in order for a flow amount of heated air to be delivered by the heating device and switches between operating and stopping the internal combustion engine such that fuel economy is improved when the signal to give priority to fuel economy is provided, as compared to when the signal is not provided, wherein said control portion controls the heating device and the internal combustion engine based on the set flow amount of heated air and based on switching between operating and stopping the internal combustion engine, wherein the control portion is programmed to control the heating device in order for the flow amount of heated air to be delivered by the heating device, such that the flow amount of heated air is changed, with respect to a change in a temperature of coolant in the internal combustion engine, at a lower rate when the signal to give priority to fuel economy is provided, as compared to when the signal is not provided.

5. A vehicle, comprising:

an internal combustion engine operable to output power for driving a vehicle;

heating device operable to heat a vehicle compartment by delivering, to the vehicle compartment, air heated by the internal combustion engine that serves as a heat source;

fuel economy priority instruction device operable to provide or stop providing a signal to give priority to fuel economy; and a control system programmed to control the heating device in order for the flow amount of heated air to be delivered by the heating device, and to switch between operating and stopping the internal combustion engine such that fuel economy is improved when the signal to give priority to fuel economy is provided, as compared to when the signal is not provided, said system controlling the heating device and the internal combustion engine based on the set flow amount of heated air and the switching between operating and stopping the internal combustion engine, wherein the control system is programmed to control the heating device in order for the flow amount of heated air to be delivered by the heating device, such that the flow amount of heated air is changed, with respect to a change in a temperature of coolant in the internal combustion engine, at a lower rate when the signal to give priority to fuel economy is provided, as compared to when the signal is not provided.

6. The vehicle according to claim 5, wherein the control system is programmed to control the heating device so that the flow amount of heated air to be delivered by the heating device produces a difference between a first engine coolant temperature, at a corresponding value of the flow amount, when the flow amount is increased with respect to a temperature of coolant, and a second engine coolant temperature, at the same corresponding value of the flow amount, when the flow amount is decreased with respect to the temperature of the engine coolant, as compared to when the signal is not provided.

7. The vehicle according to claim 5, further comprising:

temperature detection device for detecting a temperature of the vehicle compartment, wherein the control system is further programmed to control the heating device in order for the flow amount of heated air to be delivered by the heating device based on the detected temperature of the vehicle compartment.

8. The vehicle according to claim 5, wherein the control system is programmed to switch between operating and stopping the internal combustion engine such that the internal combustion engine is stopped when a temperature of air delivered to the vehicle compartment is lower when the signal to give priority to fuel economy is provided, as compared to when the signal is not provided.

9. The vehicle according to claim 5, wherein the control system is programmed to switch between operating and stopping the internal combustion engine based on an operation for driving the vehicle.

10. The vehicle according to claim 5, further comprising: a motor operable to output electric power and to drive the vehicle; and storage device for storing electric power from the motor, and for providing electric power to the motor.

* * * * *

UNITED STATES PATENT AND TRADEMARK OFFICE
CERTIFICATE OF CORRECTION

PATENT NO. : 8,561,915 B2  
APPLICATION NO. : 11/793432  
DATED : October 22, 2013  
INVENTOR(S) : M. Ishida et al.

Page 1 of 1

It is certified that error appears in the above-identified patent and that said Letters Patent is hereby corrected as shown below:

In the Specification

Column 8, line 4, change "$TAO = k1 \cdot T^* - k2 \cdot Tin - k3 - Tout - K4 \cdot Q + C$" to --$TAO = k1 \cdot T^* - k2 \cdot Tin - k3 \cdot Tout - k4 \cdot Q + C$--

Signed and Sealed this  
Eighteenth Day of March, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,561,915 B2  Page 1 of 1
APPLICATION NO. : 11/793432
DATED : October 22, 2013
INVENTOR(S) : Ishida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this

Fifteenth Day of September, 2015

Michelle K. Lee
*Director of the United States Patent and Trademark Office*